H. WEXEL.
ORNAMENTAL CHAIN.
No. 190,105.　　　　　　　　　　Patented April 24, 1877.
Fig: 1.
Fig: 2.　　Fig: 3.
　　
WITNESSES:　　　　　　　　　　　　INVENTOR:
BY
ATTORNEYS.

UNITED STATES PATENT OFFICE.

HENRY WEXEL, OF EAST ATTLEBOROUGH, MASSACHUSETTS.

IMPROVEMENT IN ORNAMENTAL CHAINS.

Specification forming part of Letters Patent No. 190,105, dated April 24, 1877; application filed September 9, 1876.

*To all whom it may concern:*

Be it known that I, HENRY WEXEL, of East Attleborough, county of Bristol, and State of Massachusetts, have invented a new and Improved Method of Making Double-Curb Chains, of which the following is a specification:

Figure 1 represents a section of chain embodying my improvement. Fig. 2 represents the face of a link, and Fig. 3 the side.

Similar letters of reference indicate corresponding parts.

My improvement consists in giving the links of a "double-curb" chain the required form before they are put together in the chain by twisting them into the proper shape by means of suitable apparatus.

The object of the invention is to provide a means whereby double-curb chains may be made without soldering, more economically than by the present method of soldering, and afterward twisting the chain to give form to the links.

Referring to the drawing, A represents a double curb chain made up of links $a$, which are formed as shown in Figs. 2 and 3. These links are given, before being put together in a chain, the same form that the links in a soldered chain receive after being put together and soldered and twisted, so that when they are put together in a chain they present the same appearance except that they are not soldered, and have not the flattened appearance given them in the operation of forming or twisting.

The ordinary way of making a chain of this description is to place links together having a plain elliptical form, and solder them singly, and when the chain is complete it is twisted and flattened to give it the desired appearance.

This process consumes a great amount of time, and many of the links are often broken in twisting, which necessitates doing the work over.

By my improvement all these difficulties are obviated, and a chain of superior appearance produced.

In the old process of making curb-chains the links are first coupled together, and the whole chain then subjected to compression, so as to give it the proper shape and degree of compactness. In order to accomplish this it is necessary to solder the open ends of each link together to prevent them from being separated and opened during the compressing operation.

This soldering greatly augments the cost of chains, while some of the links will even then be forced open. I avoid the latter objection, and also the expense of soldering, by shaping each link separately before they are all coupled together. I also greatly expedite the manufacture of these chains by my method or process, being able to make ten times as many of a given length, and with a given number of workmen, as can be done in the old way; hence

What I claim is—

As an improved article of manufacture, a double-curb chain formed of the links $a$, bent or twisted into the shape described and shown, and united together without the employment of solder, substantially as specified.

HENRY WEXEL.

Witnesses:
 WM. M. STONE,
 H. S. STONE.